No. 751,857. PATENTED FEB. 9, 1904.
E. KRAUSE.
SYSTEM OF ELECTRICAL PROPULSION.
APPLICATION FILED OCT. 22, 1903.
NO MODEL.

Witnesses: Inventor
Erich Krause
By his Attorneys

No. 751,857.

Patented February 9, 1904.

UNITED STATES PATENT OFFICE.

ERICH KRAUSE, OF HOBOKEN, NEW JERSEY, ASSIGNOR OF ONE-FIFTH TO HANS KÜRTEN AND ROSA KÜRTEN, OF HOBOKEN, NEW JERSEY.

SYSTEM OF ELECTRICAL PROPULSION.

SPECIFICATION forming part of Letters Patent No. 751,857, dated February 9, 1904.

Application filed October 22, 1903. Serial No. 178,052. (No model.)

*To all whom it may concern:*

Be it known that I, ERICH KRAUSE, a citizen of the Empire of Germany, residing at Hoboken, county of Hudson, and State of New Jersey, have invented certain new and useful Improvements in Systems of Electrical Propulsion, of which the following is a specification.

This invention relates to an improved system of electrical propulsion of bodies which is based on the principle of the attraction of an armature by a coil through which a current of electricity passes.

The invention has for its object to provide means whereby bodies may be moved by induction, so as not to require a motor.

For this purpose the invention consists of a system of electrical propulsion comprising a plurality of spirally-wound coils arranged one next to the other and insulated from each other, the ends of one coil extending into the preceding coil, a source of electricity, main conductors connected therewith and provided with auxiliary conductors in proximity to the ends of the coil, tracks arranged in said coils and passing through the same, and a wheeled armature movable on said tracks provided with contact-makers for connecting one of the auxiliary conductors with the adjacent ends of the coil for energizing the same and attracting the wheeled armature toward and through the same, after which the energized coil is cut out of circuit and the next one cut in and energized, whereby the wheeled armature is again drawn forward, as will be more fully described hereinafter, and finally pointed out in the claims.

Figure 1:
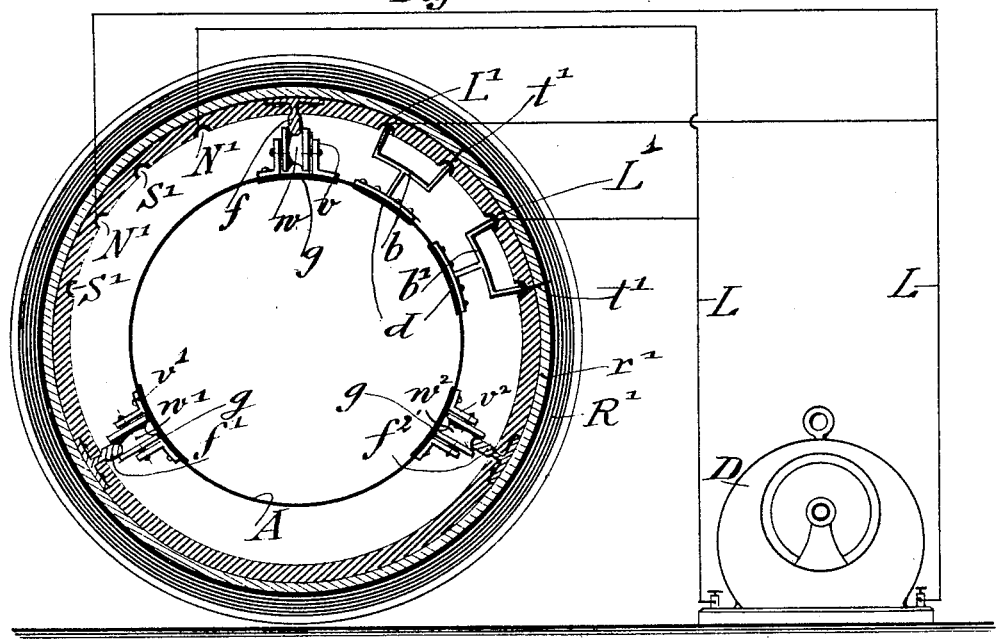
Figure 2:
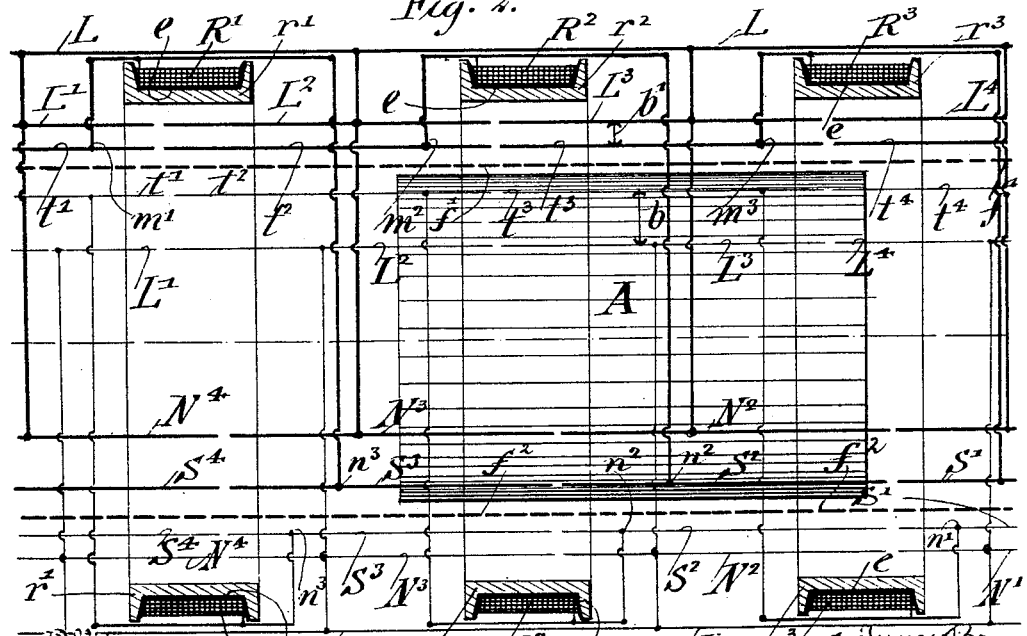

In the accompanying drawings, Figure 1 shows a vertical transverse section of one of the coils and connections therefor used in my improved system of electric propulsion, and Fig. 2 is a wiring diagram showing the connections of the coils.

Similar letters of reference indicate corresponding parts.

Referring to the drawings, D represents an electric generator to which the main conductors L are connected, which are connected at intervals with auxiliary conductors $L'$ $L^2$ $L^3$ $L^4$. Wires forming a plurality of coils $R'$ $R^2$ $R^3$ are wound on iron cores $r'$ $r^2$ $r^3$, being separated from the same by layers $e$ of insulated material. The cores are arranged next to each other and when arranged close together are insulated from each other. The ends $m'$ $m^2$ $m^3$ of the coils $R'$ $R^2 R^3$ are connected with rods $t'$ $t^2$ $t^3$, parallel and in proximity to the auxiliary conductors $L'$ $L^2$ $L^3$ and of approximately the same length as the conductors. The rods $t'$ $t^2$ $t^3$ extend from a point of about one-fourth of the width of one coil to a corresponding point of the preceding coil and pass through the interior of the coils. The coils $R'$ $R^2 R^3$ are provided at their interior with tracks $f$ $f'$ $f^2$, preferably of circular cross-section. An armature A, consisting of a plurality of iron rods and provided with wheels $w$ $w'$ $w^2$, the shafts of which are supported in brackets $v$ $v'$ $v^2$, which are insulated from the armature by pieces $g$ of suitable insulating material, is movable on these tracks. The armature is provided with two contact-makers $b$ $b'$, which are insulated by pieces $d$ of suitable insulating material from the armature. These contact-makers are arranged so as to connect the rods $t'$ $t^2$ $t^3$, with which the ends of the coils are connected with the auxiliary conductors $L'$ $L^2$ $L^3$ immediately in proximity thereto, so as to cause the electric current to pass from one of the auxiliary conductors—the positive one, for example—to the positive rod adjacent thereto through the coil, thereby energizing the same and setting up a magnetic field in the interior of the iron core. The current then passes to the negative end of the coil and rod attached to the negative auxiliary conductor and returns to the generator. By this connection the current passing from the auxiliary conductor to the coil energizes the same and causes thereby the attraction of the armature toward and through that coil which is energized and core which is magnetized. The inertia imparted to the armature by this attraction causes the same to pass entirely through the coil and somewhat beyond the same, so that the contact-makers $b$ $b'$ of the armature connect the ends of the next coil with the auxiliary conductors adjacent thereto and so energize the next coil after having broken the contact of the coil first energized. The action of this newly-energized coil is similar to the first. It attracts the armature and causes the same to pass toward and through the coil. By the successive energizing of each coil the armature is attracted and so propelled from one place to the other through the interior of the coils.

When the armature arrives at the intended destination, it is reversed in position, whereby the contact-makers $b$ $b'$ of the same make contact with the rods $S'$ $S^2$ $S^3$, connected with the ends $n'$ $n^2$ $n^3$ of the coils and arranged parallel and in proximity to auxiliary conductors $N'$ $N^2$ $N^3$, connected with the main conductors, arranged so as to energize the coils, whereby the armature is again propelled similarly to the manner above described and returned to its starting-point. Having once obtained a motion, the armature moves along the rails, simultaneously breaking the current in one coil, whereby a repulsive effect is exerted on the armature, while making the current in the next following coil, whereby an attractive effort is exerted on the armature toward the next coil.

The armature is so constructed, preferably of laminated bars, that no currents are induced therein which would cause the objectionable heating of the same.

I claim as new and desire to secure by Letters Patent—

1. A system of electrical propulsion of bodies, comprising a plurality of cores, wires wound on said cores forming coils, rods arranged in the interior of said coils and cores, the end of said coils being connected with the rods, a source of electricity, main conductors connected therewith, auxiliary conductors in proximity to said rods connected with the main conductors, and a movable armature adapted to electrically connect one set of rods with the movable conductors adjacent thereto, for energizing successively one coil after another for attracting the armature and causing the same to pass through the coils, substantially as set forth.

2. A system of electrical propulsion of bodies, comprising a plurality of cores, wires wound on said cores forming coils and insulated from the same, arranged one next to the other, rods arranged in the interior of said coils and cores, the ends of said coils being connected with the rods, a source of electricity, main conductors connected therewith, auxiliary conductors in proximity to said rods connected with said main conductors, rails passing through said coils, an armature, contact-makers on said armature for connecting successively one set of rods with the auxiliary conductors adjacent thereto, for energizing successively one coil after another for attracting the armature and causing the same to pass through the coils, substantially as set forth.

In testimony that I claim the foregoing as my invention I have signed my name in presence of two subscribing witnesses.

ERICH KRAUSE.

Witnesses:
PAUL GOEPEL,
HENRY J. SUHRBIER.